United States Patent
Huang et al.

(10) Patent No.: US 8,203,294 B2
(45) Date of Patent: Jun. 19, 2012

(54) ELECTRIC ENERGY STORAGE INTEGRATED WITHIN OR PROXIMATE TO ELECTRICALLY DRIVEN FLIGHT CONTROL ACTUATORS

(75) Inventors: Hao Huang, Troy, OH (US); David Dimitri Karipides, Casstown, OH (US); Arthur Vorwerk Radun, Mason, OH (US)

(73) Assignee: GE Aviations Systems LLC, Grand Rapids, MI (US)

( * ) Notice: Subject to any disclaimer, the term of this patent is extended or adjusted under 35 U.S.C. 154(b) by 690 days.

(21) Appl. No.: 12/277,939

(22) Filed: Nov. 25, 2008

(65) Prior Publication Data
US 2010/0127647 A1 May 27, 2010

(51) Int. Cl.
H02P 6/04 (2006.01)
H02P 3/18 (2006.01)
H02P 6/14 (2006.01)
G05B 11/36 (2006.01)
G05B 1/06 (2006.01)

(52) U.S. Cl. ............. 318/400.11; 318/376; 318/400.26; 318/609; 318/638

(58) Field of Classification Search ............. 318/400.26, 318/400.11, 376, 609, 638
See application file for complete search history.

(56) References Cited

U.S. PATENT DOCUMENTS

| | | | |
|---|---|---|---|
| 6,101,106 A | 8/2000 | Shi | |
| 6,243,277 B1 | 6/2001 | Sun et al. | |
| 6,577,106 B2 | 6/2003 | Lazarovich | |
| 6,628,011 B2 * | 9/2003 | Droppo et al. | 307/43 |
| 6,646,409 B2 * | 11/2003 | Won et al. | 318/701 |
| 6,661,679 B1 | 12/2003 | Yang et al. | |
| 6,737,762 B2 * | 5/2004 | Koenig | 307/48 |
| 7,494,263 B2 * | 2/2009 | Dykstra et al. | 366/17 |
| 2006/0267523 A1 | 11/2006 | Seelig et al. | |
| 2008/0174177 A1 | 7/2008 | Langlois et al. | |
| 2009/0242288 A1 * | 10/2009 | Oyobe et al. | 180/65.265 |
| 2010/0019737 A1 * | 1/2010 | Leboeuf | 320/167 |
| 2010/0085784 A1 * | 4/2010 | Chou et al. | 363/45 |
| 2010/0109581 A1 * | 5/2010 | Sheahan et al. | 318/376 |

FOREIGN PATENT DOCUMENTS

EP 1956700 A1 8/2008
WO 02093730 A1 11/2002

OTHER PUBLICATIONS

Demerdash N A et al "Dynamic Modeling of Brushless dc Motors for Aerospace Actuation", IEEE Transactions on Aerospace and Electronic Systems, Nov. 1, 1980, pp. 811-821, ISSN:0018-9251, vol. AES-10 No. 6.
Silvestre J "Half-bridge Bidirectional DC-DC Converter for small Electric Vehicle", Jun. 11, 2008, pp. 884-888, Speedam 2008 International Symposium on Power Electronics, Electrical Drives, Automation and Motion, ISBN: 978-1-4244-1663-9.
PCT/ US2009/065679, Search Report, Mar. 1, 2010.

\* cited by examiner

*Primary Examiner* — Bentsu Ro
*Assistant Examiner* — Gabriel Agared
(74) *Attorney, Agent, or Firm* — David J. Clement, Esq.; Armstrong Teasdale LLP

(57) ABSTRACT

An apparatus for use with a flight control actuator and method for assembling the same is provided. The apparatus includes a motor drive system and a control unit. The motor drive system includes a capacitor-based energy storage configured to store and provide energy within or proximate to the actuator. The control unit is coupled to the motor drive system and is configured to facilitate managing power within or proximate to the actuator.

18 Claims, 3 Drawing Sheets

ELECTRIC ENERGY STORAGE INTEGRATED WITHIN OR PROXIMATE TO ELECTRICALLY DRIVEN FLIGHT CONTROL ACTUATORS

BACKGROUND OF THE INVENTION

This invention relates generally to aircraft engine power systems and, more particularly, to methods and apparatus for providing energy to and storing energy within or proximate to electrically driven flight control actuators.

Some known aircrafts use electrically driven flight control actuators. Although electrically driven actuators are more complex and less user-friendly than hydraulically or pneumatically driven actuators, electrically driven flight control actuators generally are lighter in weight, require less maintenance, and are more reliable than hydraulically or pneumatically driven flight control actuators. Known electrical power systems, however, channel regenerative transient energy back into the electrical power system, which increases a voltage of a primary power distribution bus. A high voltage of the primary power distribution bus may cause the bus voltage to be out of MIL-STD-704 specification, damage electric devices on the bus, or generate excessive heat on the aircraft, each of which may jeopardize a flight mission.

To facilitate storing transient energy, some known aircrafts use either a centralized battery based or battery/ultra-capacitor hybrid based energy storage to facilitate absorbing excessive energy returned from flight control actuators and releasing energy back to the actuators whey they require it. Using a centralized energy storage, however, may induce reliability issues to the electrical power system. For example, some known batteries have sensitive operating temperatures that, without a constant precise temperature control, may result in fires. For another example, some known batteries have sensitive battery lives that are prone to a rate and a depth of charge and discharge, especially when used in systems that require a high charging rate and an irregular pattern of charge and discharge cycles. Therefore, there is a need to provide a more reliable electrical power system that facilitates storing excessive energy returned from actuators.

BRIEF SUMMARY OF THE INVENTION

In one embodiment, a method for assembling an apparatus for use with a flight control actuator is provided. The method includes providing a motor drive system that includes a capacitor-based energy storage, the energy storage configured to store and provide energy within or proximate to the actuator; and coupling a control unit to the motor drive system, the control unit configured to facilitate managing power within or proximate to the actuator.

In another embodiment, a motor drive system for use with a flight control actuator is provided. The motor drive system includes a buck-boost converter that includes a first insulated-gate bipolar transistor, a second insulated-gate bipolar transistor, an inductor, and a capacitor-based energy storage configured to store and provide energy within or proximate to the actuator, the buck-boost converter configured to charge and discharge the energy storage.

In yet another embodiment, an apparatus for use with a flight control actuator is provided. The apparatus includes a motor drive system that includes a capacitor-based energy storage, the energy storage configured to store and provide energy within or proximate to the actuator; and a control unit coupled to the motor drive system, the control unit configured to facilitate managing power within or proximate to the actuator.

DETAILED DESCRIPTION OF THE INVENTION

The systems and methods described herein facilitate locally storing excess energy within or proximate to an actuator and facilitate reducing the amount of excess energy that returns to a primary power distribution bus. As such, electrically driven actuators should have little to no impact on the rest of the electrical power system.

Figure 1:
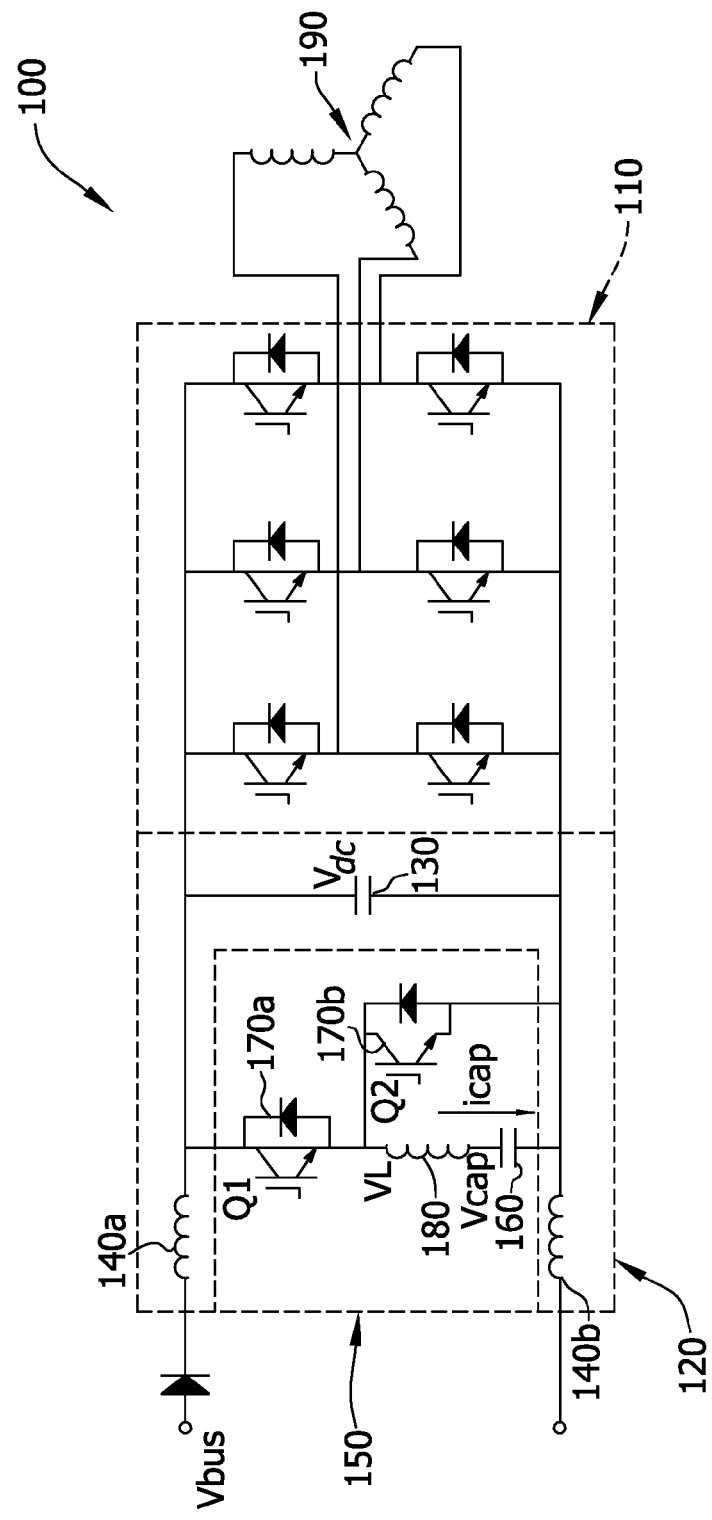
FIG. 1 is a schematic illustration of a motor drive system of a flight control actuator.

FIG. 1 is a schematic illustration of a motor drive system 100 of a flight control actuator (not shown) that is coupled to a primary power distribution system (not shown).

In the exemplary embodiment, control system 100 includes an inverter 110, also referred to as a full wave bridge, including six insulated-gate bipolar transistors (IGBT, not numbered), a direct current (DC) link filter 120 including a capacitor bank 130 and a plurality of inductors 140a and 140b, and a branch that includes a buck-boost converter 150 coupled to a capacitor-based energy storage 160.

In the exemplary embodiment, energy storage 160 is configured to have a high energy density, a high power density, and a high temperature tolerance. These characteristics facilitate storing energy in a small, robust, and practical energy storage 160 that can be encased within or proximate to an actuator. In one embodiment, capacitor-based energy storage 160 uses an ultra film capacitor technology that is being developed by GE Global Research Center.

In the exemplary embodiment, buck-boost converter 150 includes an upper power switch 170a, a lower power switch 170b and an inductor 180. In the exemplary embodiment, control system 100 is coupled to a stator winding 190 of a permanent magnetic motor of the actuator (not shown). Notably, while the exemplary embodiment includes, for example, three phase inverter 110 including six IGBTs coupled to three phase stator winding 190, the number of components or specific features of the components is not intended to limit the invention in any manner.

During operation, in the exemplary embodiment, buck-boost convertor 150 facilitates locally storing excess or transient energy within or proximate to the actuator. Moreover, buck-boost convertor 150 facilitates reducing the amount of excess energy that returns to a voltage bus (not shown) of the primary power distribution.

More specifically, during operation of an actuator regenerative mode, buck-boost converter 150 is configured to operate as a buck convertor, energy storage 160 is configured to be in a charging mode, and lower power switch 170b is switched off. More specifically, when upper power switch 170a is switched on, a voltage bus (not shown) of the primary power distribution system, also referred to as a primary power distribution bus, supplies a current through upper power switch 170a to energize inductor 180 and charge energy storage 160. When upper power switch 170a is switched off, and when inductor 180 has stored energy, inductor 180 supplies current through a diode (not numbered) in lower power switch 170b to continuously charge energy storage 160.

During operation of an actuator operational but non-regenerative mode, buck-boost converter 150 is configured to operate as a boost converter, energy storage 160 is configured to be in a discharging mode, and upper power switch 170a is switched off. When lower power switch 170b is switched on, energy storage 160 supplies a current to energize inductor 180, and the current flows back to the negative terminal of energy storage 160 through lower power switch 170b. When lower power switch 170b is switched off, the free wheeling current continues through a diode (not numbered) in upper power switch 170a to charge capacitor bank 130 in DC link filter 120.

Figure 2:
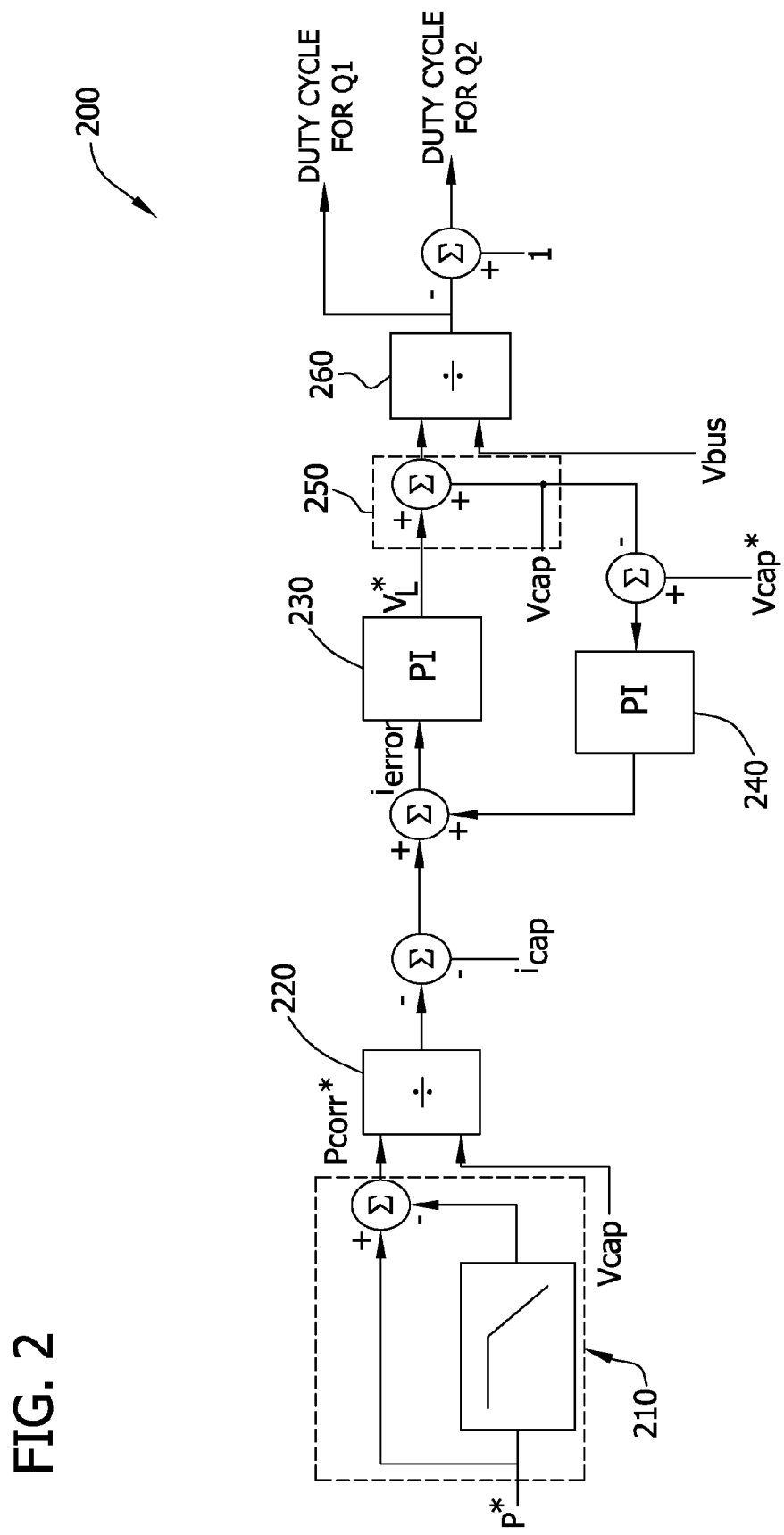
FIG. 2 is a schematic illustration of a control unit for use with the motor drive system shown in FIG. 1.

FIG. 2 is a schematic illustration of a control unit 200 that facilitates controlling buck-boost converter 150 to reduce the impact of the actuator on the voltage bus of the primary power distribution. In the exemplary embodiment, control unit 200 includes a high pass filter 210, a power to current transfer 220, a first proportional integration (PI) controller 230, a second PI controller 240, a capacitor voltage decoupling block 250, and a voltage to pulse width modulation (PWM) ratio transfer 260. In the exemplary embodiment, high pass filter 210 is configured to ensure that buck-boost converter 150 facilitates processing dynamic load transients. In the exemplary embodiment, power to current transfer 220 is configured to convert a power command to a command that facilitates controlling a current of energy storage 160. In the exemplary embodiment, first PI controller 230 is configured to regulate a current channeled to and from energy storage 160, and second PI controller 240 is configured to maintain an average voltage of energy storage 160 at a desired level. In the exemplary embodiment, capacitor voltage decoupling block 250 is configured to determine a desired voltage at power switches 170a and 170b to field a specified voltage across inductor 180. In the exemplary embodiment, voltage to PWM ratio transfer 260 is configured to convert a voltage command to a duty cycle that facilitates controlling power switches 170a and 170b.

During operation, in the exemplary embodiment, buck-boost converter 150 processes load current transients that have a frequency component that are above a cutoff frequency of high pass filter 210. In the exemplary embodiment, high pass filter 210 facilitates ensuring that buck-boost converter 150 processes dynamic load current transients. Moreover, because energy storage 160 is configured to store a finite amount of energy, high pass filter 210 facilitates managing the power provided by buck-boost converter 150 to operate inverter 110. For example, in the exemplary embodiment, inverter 110 demands an instantaneous active power P* from at least one of the primary power distribution bus and energy storage 160. Moreover, in the exemplary embodiment, inverter 110 supplies instantaneous active power P* to energy storage 160 by capturing kinetic energy via, for example, regenerative power from stator winding 190.

More specifically, active power P* is channeled through high pass filter 210. To determine a current $i_{cap}$* for energy storage 160 that would facilitate diverting a load of inverter 110 transient from the primary power distribution bus, a signal $P_{corr}$* passing through current transfer 220 is divided by a voltage $V_{cap}$ of energy storage 160. Determined current $i_{cap}$* is subtracted from a measured current $i_{cap}$ to generate a current error signal $i_{error}$. Error signal $i_{error}$ passes through first PI controller 230 to determine a desired voltage $V_L$* for inductor 180 that would quickly bring error signal $i_{error}$ to zero. Capacitor voltage decoupling block 250 determines a desired voltage at a switching point of buck-boost convertor 150 that would yield a specified voltage $V_L$ across inductor 180. The output of current transfer 220 is divided by a voltage $V_{bus}$ of the primary power distribution bus to calculate a duty cycle in the range of 0-1 to be used to control power switches 170a and 170b. Depending on a polarity of current error signal $i_{error}$, either upper power switch 170a or lower power switch 170b is switched on and the other is switched off. Moreover, second PI controller 240 facilitates maintaining a desired voltage of energy storage 160 by adding a correction factor to current error signal $i_{error}$.

Figure 3:
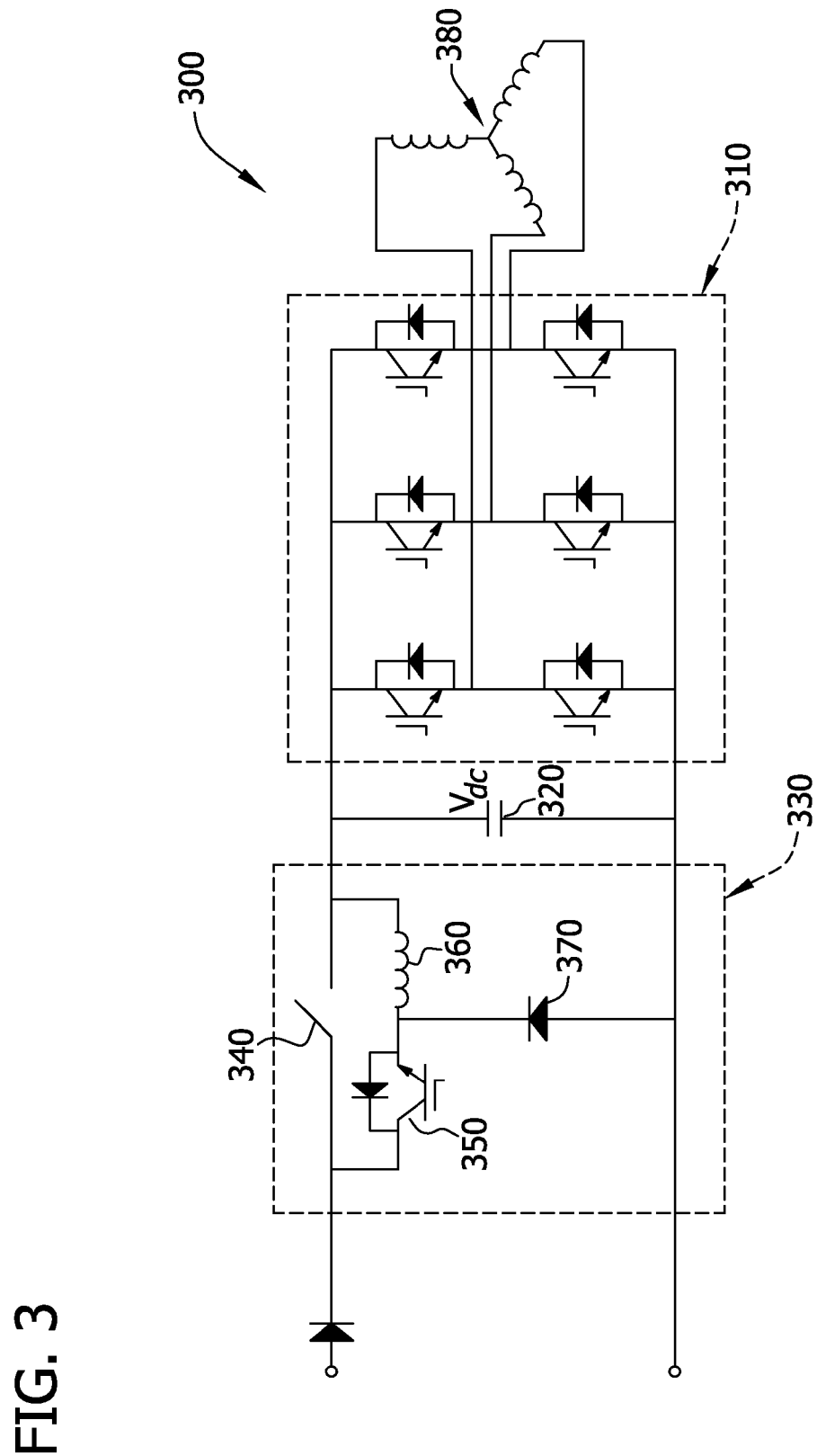
FIG. 3 is a schematic illustration of another embodiment of the motor drive system shown in FIG. 1.

FIG. 3 is a schematic illustration of another embodiment 300 of control system 100 shown in FIG. 1. In the embodiment shown in FIG. 3, control system 300 includes an inverter 310, also referred to as a full wave bridge, including six IGBTs (not numbered), an ultra film capacitor 320, and a soft start circuit 330 including a contactor 340, a power switch 350, an inductor 360, and a diode 370. Capacitor 320 is configured to act as a direct current link and an energy storage. In the exemplary embodiment, soft start circuit 330 facilitates soft-charging capacitor 320, and contactor 340 is configured to close when capacitor 320 is fully charged. In the exemplary embodiment, control system 300 is coupled to stator winding 380 of a permanent magnetic motor of the actuator (not shown) which demands and supplies power to and from capacitor 320. Control system 300 is configured to provide sufficient energy absorbing and providing capabilities for locally storing excess energy within or proximate to an actuator.

The methods, apparatus, and systems described herein for electric energy storage integrated within or proximate to electrically driven flight control actuators are not limited to the specific embodiments described herein. The electric energy storage systems described herein facilitate locally storing excessive energy within or proximate to actuators. Practice of the methods, apparatus, or systems described or illustrated herein is not limited to flight driven actuators. Rather, the methods, apparatus, and systems described or illustrated herein may be utilized independently and separately from other components and/or steps described herein.

The written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in terms of various specific embodiments, those skilled in the art will recognize that the invention can be practiced with modification within the spirit and scope of the claims.

What is claimed is:

1. A method for assembling an apparatus for use with a flight control actuator, said method comprising:
   providing a motor drive system that comprises a capacitor-based energy storage, the energy storage configured to store and provide energy within or proximate to the actuator; and
   coupling a control unit to the motor drive system, the control unit configured to facilitate managing power within or proximate to the actuator, wherein the control unit includes a first proportional integration controller configured to regulate a current channeled to and from the energy storage and a second proportional integration controller configured to maintain a substantially steady voltage of the energy storage.

2. A method for assembling an apparatus in accordance with claim 1, wherein said providing a motor drive system further comprises:
providing a motor drive system that further comprises a buck-boost converter that includes a first insulated-gate bipolar transistor, a second insulated-gate bipolar transistor, and an inductor, the buck-boost converter configured to charge and discharge the energy storage.

3. A method for assembling an apparatus in accordance with claim 2, wherein said providing a motor drive system further comprises:
providing a motor drive system that further comprises the first insulated-gate bipolar transistor that is serially coupled to a parallel circuit that includes the second insulated-gate bipolar transistor coupled in parallel to the inductor that is serially coupled to the energy storage.

4. A method for assembling an apparatus in accordance with claim 2, wherein said providing a motor drive system further comprises:
providing a motor drive system that further comprises a direct current link capacitor, an inverter, and a stator winding; and
coupling the direct current link capacitor and the inverter to the stator winding, each of the direct current link capacitor and the inverter coupled in parallel with the buck-boost convertor.

5. A method for assembling an apparatus in accordance with claim 2, wherein said coupling a control unit further comprises:
coupling a control unit that comprises a high pass filter configured to ensure that the buck-boost converter facilitates processing dynamic load transients.

6. A method for assembling an apparatus in accordance with claim 1, wherein said providing a motor drive system further comprises providing a motor drive system that further comprises a soft-start circuitry that is coupled to the energy storage, wherein the soft-start circuitry includes a contactor that is configured to close when the energy storage is fully charged.

7. A motor drive system for use with a flight control actuator comprising:
a buck-boost converter that comprises a first insulated-gate bipolar transistor, a second insulated-gate bipolar transistor, an inductor, and a capacitor-based energy storage configured to store and provide energy within or proximate to said actuator, said buck-boost converter configured to charge and discharge said energy storage; and
a control unit coupled to the motor drive system, the control unit configured to facilitate managing power within or proximate to the actuator, wherein the control unit includes a first proportional integration controller configured to regulate a current channeled to and from the energy storage and a second proportional integration controller configured to maintain a substantially steady voltage of the energy storage.

8. A motor drive system in accordance with claim 7, wherein said first insulated-gate bipolar transistor is serially coupled to a parallel circuit that comprises said second insulated-gate bipolar transistor coupled in parallel to said inductor that is serially coupled to said energy storage.

9. A motor drive system in accordance with claim 7 further comprising a direct current link capacitor coupled in parallel with said buck-boost convertor.

10. A motor drive system in accordance with claim 7 further comprising an inverter and a stator winding coupled in parallel with said buck-boost convertor.

11. A motor drive system in accordance with claim 7, wherein said buck-boost converter is coupled to a control unit that comprises a high pass filter that is configured to ensure that said buck-boost converter facilitates processing dynamic load transients.

12. A motor drive system in accordance with claim 7 further comprising a soft-start circuitry that is coupled to said energy storage, wherein said soft-start circuitry includes a contactor that is configured to close when the energy storage is fully charged.

13. An apparatus for use with a flight control actuator, said apparatus comprising:
a motor drive system that comprises a capacitor-based energy storage, said energy storage configured to store and provide energy within or proximate to said actuator; and
a control unit coupled to said motor drive system, said control unit configured to facilitate managing power within or proximate to said actuator, said control unit comprising a first proportional integration controller configured to regulate a current channeled to and from the energy storage and a second proportional integration controller configured to maintain a substantially steady voltage of the energy storage.

14. An apparatus in accordance with claim 13, wherein said motor drive system further comprises a buck-boost converter that includes a first insulated-gate bipolar transistor, a second insulated-gate bipolar transistor, and an inductor, said buck-boost converter configured to charge and discharge said energy storage.

15. An apparatus in accordance with claim 14, wherein said first insulated-gate bipolar transistor is serially coupled to a parallel circuit that comprises said second insulated-gate bipolar transistor coupled in parallel to said inductor that is serially coupled to said energy storage.

16. An apparatus in accordance with claim 14, wherein said motor drive system further comprises a direct current link capacitor and an inverter coupled to a stator winding, each of said direct current link capacitor and said inverter coupled in parallel with said buck-boost convertor.

17. A motor drive system in accordance with claim 13, wherein said motor drive system further comprises a buck-boost converter, wherein said control unit comprises a high pass filter that is configured to ensure that said buck-boost converter facilitates processing dynamic load transients.

18. An apparatus in accordance with claim 13, wherein said motor drive system further comprises a soft-start circuitry that is coupled to said energy storage, wherein said soft-start circuitry includes a contactor that is configured to close when the energy storage is fully charged.

* * * * *